United States Patent [19]
Usami

[11] Patent Number: 5,386,305
[45] Date of Patent: Jan. 31, 1995

[54] COLOR IMAGING PROCESSING METHOD AND APPARATUS FOR SUPPRESSING COLOR BLURS

[75] Inventor: Akihiro Usami, Yokohama, Japan

[73] Assignee: Canon Kabushiki Kaisha, Tokyo, Japan

[21] Appl. No.: 35,968

[22] Filed: Mar. 23, 1993

[30] Foreign Application Priority Data

Mar. 26, 1992 [JP] Japan .................................. 4-068055

[51] Int. Cl.⁶ .......................... H04N 1/46; G03F 3/08
[52] U.S. Cl. ..................................... 358/518; 358/521
[58] Field of Search ............... 358/501, 502, 515, 518, 358/520, 521, 523, 529, 534

[56] References Cited

U.S. PATENT DOCUMENTS

| | | | |
|---|---|---|---|
| 4,656,505 | 4/1987 | Yamada et al. | 358/521 |
| 4,908,712 | 3/1990 | Uchiyama et al. | 358/529 |
| 4,965,664 | 10/1990 | Udagawa et al. | |
| 5,113,248 | 5/1992 | Hibi et al. | 358/501 |
| 5,172,223 | 12/1992 | Suzuki et al. | |

Primary Examiner—Scott A. Rogers
Attorney, Agent, or Firm—Fitzpatrick, Cella, Harper & Scinto

[57] ABSTRACT

A color image processing method and apparatus in which reproducibility of gray color is improved. UCR processing and black color density extraction processing are performed so as to compensate homogeneity of gray color by changing the setting of UCR and black color toner/ink amount in an intermediate density area and high density area. When brightness (RGB) image signals are converted into density (YMCBk) image signals, in the masking UCR circuit 406-2, UCR and black color toner/ink amount is increased in the intermediate density area, while UCR is reduced in the high density area. Or UCR and black color toner/ink amount is increased in the intermediate density area and achromatic area of the intermediate density area is expressed only by the black component, while the UCR is reduced in the high density area. Corresponding density image signals are thus converted.

15 Claims, 5 Drawing Sheets

COLOR IMAGING PROCESSING METHOD AND APPARATUS FOR SUPPRESSING COLOR BLURS

BACKGROUND OF THE INVENTION

This specification relates to a color image processing method and apparatus thereof and, more particularly, to a color image processing method and apparatus capable of converting a brightness image signal into a corresponding density image signal.

A basic processing performed by a conventional color image processing method adapted to a color image processing apparatus is that image signals of RGB (red, green, blue), brightness image signals, are converted into image signals of YMCBk (yellow, magenta, cyan, black), density image signals. In case of a halftone image, UCR (under color removal) and black color toner/ink densities are reduced, while UCR and black color toner/ink densities are increased as the density of an image becomes higher.

An example of the conversion characteristics of a halftone image in the conventional color image processing method is shown in FIG. 7. In FIG. 7, the horizontal axis represents values of YMC signals before the UCR processing and black color density extraction processing. The vertical axis represents values of YMCBk after the above processings. The black (Bk) component is obtained from the following equation: Bk = min (Y, M, C). In the case of a halftone image such as gray color, since each of the YMC values is the same, the black component value obtained from the above equation is equal to each of YMC values. Accordingly, Bk=Y=M=C is held on the horizontal axis.

In the UCR and black color toner injection processing, in accordance with the conversion characteristics shown in FIG. 7, since little Bk is output for a skin color dominant image in which the tonality is light, ideally, a pseudo-outline should not exist.

In the conventional method, as in electronic photography, since the screen angle causes reduction in resolution, colors lay on top of each other. In this case, three colors, Y, M, C, are accumulately overlaid to express a halftone color such as gray.

However, if the position to output the toners or inks of the three colors (Y, M, C) deviates, the color expressed can be reddish gray or yellowish gray (This is referred to as "color blurs").

Furthermore, when a gray color is spread to the entire copy paper, the output color can be partially uneven and it looks unnatural. This unevenness stands out when a homogeneous gray-color image is produced by a computer.

Images produced by a computer graphics technique have a tendency to have less skin color, more gray color, and high-chromaticity colors. Therefore, the problem in the conventional method is homogeneity of the color of the output image produced by color blurs.

SUMMARY OF THE INVENTION

Accordingly, it is an object of the present invention to provide a color image processing method capable of obtaining high reproducibility in a gray-color image.

According to the present invention, the foregoing object is attained by a color image processing method adapted to a color processing apparatus of converting a multivalued brightness image signal into a multivalued density image signal, comprising: first conversion step for converting a first multivalued density image signal to a second multivalued density image signal so that, in case of expressing halftone, the conversion rate using Bk (black) component instead of each of color components Y (yellow), M (magenta), and C (cyan) is increased, when each of color components Y (yellow), M (magenta), and C (cyan) composed of the first multivalued density image signal converted, by quasi-inversion, from the multivalued brightness image signal is equal to each other and of which is relatively small value; and second conversion step for converting the first multivalued density image signal to a second multivalued density image signal so that, in case of expressing halftone, the rate to apply UCR is decreased, when each of color components Y (yellow), M (magenta), and C (cyan) composed of the first multivalued density image signal converted from the multivalued brightness image signal is equal to each other and of which is relatively large value.

It is another object of the present invention to provide a color image processing method capable of obtaining high reproducibility in a gray-color image.

According to the present invention, the foregoing object is attained by a color image processing method adapted to a color processing apparatus of converting a multivalued brightness image signal into a multivalued density image signal, comprising: first conversion step for converting a first multivalued density image signal to a second multivalued density image signal, in case of expressing halftone, so as to express only with Bk (black) component instead of each of color components Y (yellow), M (magenta), and C (cyan), when each of color components Y (yellow), M (magenta), and C (cyan) composed of the first multivalued density image signal converted, by quasi-inversion, from the multivalued brightness image signal is equal to each other and of which is relatively small value; and second conversion step for converting the first multivalued density image signal to a second multivalued density image signal so that, in case of expressing halftone, the rate to apply UCR is decreased, when each of color components Y (yellow), M (magenta), and C (cyan) composed of the first multivalued density image signal converted from the multivalued brightness image signal is equal to each other and of which is relatively large value.

It is another object of the present invention to provide a color image processing apparatus capable of obtaining high reproducibility in a gray-color image.

According to the present invention, the foregoing object is attained by a color image processing apparatus of converting a multivalued brightness image signal into a multivalued density image signal, comprising: input means for inputting color image by brightness image signal; first conversion means for converting the brightness image signal to a first density image signal; extraction means for extracting a black component from the first density image signal; second conversion means for converting the first density image signal to a second density signal by performing UCR processing based upon the black component so as to express the image by using more black component on an area where the signal value of the first density image signal is in a low or intermediate density area; and output means for outputting the image using the second density image signal.

In accordance with the present invention as described above, in a density image signal expressing a multivalued image, the density of the image expressed by a black component is changed between areas where the density value is small and large.

The invention is particularly advantageous since the reproducibility in gray color is improved by changing the density of the image expressed by the black component between the areas where the density value is small and large in the density image signal expressing a multi-valued image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

[General description of the apparatus (FIG. 1)]

Figure 1:
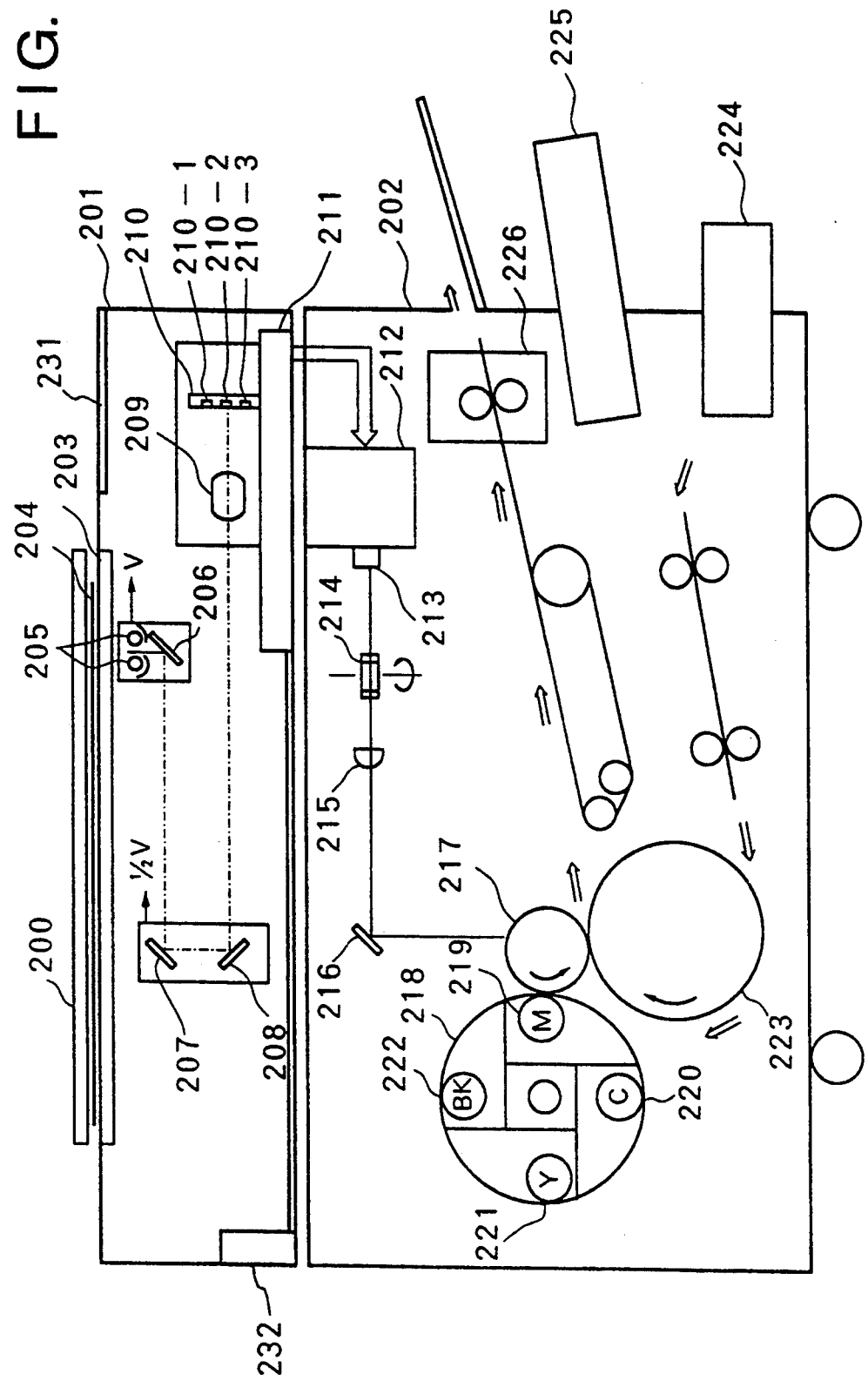
FIG. 1 is a sectional side view showing the construction of a color copying machine of a typical embodiment of the present invention.

FIG. 1 is a sectional side view showing the construction of a copying machine of a typical embodiment of the present invention. Numeral 201 denotes an image scanning section 201 which reads an original image manuscript at a resolution of 400 dpi (dots/inch) and processes a digital signal processor. Numeral 202 denotes a printing section 202 which prints a full-color image corresponding to the original image read by the image scanning section 201 on a print sheet at a resolution of 400 dpi.

The image scanning section 201 includes a pressure plate having a mirror surface 200. An original image manuscript 204 on a glass table (platen) 203 is irradiated by means of lamps 205, an image is formed on a three-line sensor (hereinafter referred to as a "CCD") 210 via mirrors 206, 207, and 208 and a lens 209, and the image is sent to a signal processor 211 as full-color information red (R), green (G) and blue (B) components. The entire original image manuscript is scanned (sub-scanning) by mechanically moving the carriage 227 fixing the lamps 205 and mirror 206 at a velocity v as well as the mirrors 207, 208 at a velocity ½ v in a direction perpendicular to the electrical scanning direction (a main scanning direction) of the line sensor.

The signal processor 211 processes the read image signal, separates the signal into magenta (M), cyan (C), yellow (Y), and black (Bk) components and sends these components to the printing section 202. At least one component among the M, C, Y, Bk components is sent to the printing section 202 per scan of the original image manuscript in the image scanning section 201, and a single print-out is completed by a total of four scans of the original image manuscript.

Each image signal M, C, Y or Bk received from the image scanning section 201 is sent to a laser driver 212. The laser driver 212 modulates and drives a semiconductor laser 213 in accordance with the received image signal. The laser light is made to scan across a photosensitive drum 217 via a polygon mirror 214, an f-$\theta$ lens 215 and a mirror 216. Numeral 218 represents a revolving developer comprising a magenta developing section 219, a cyan developing section 220, a yellow developing section 221 and a black developing section 222. These four developing sections come into alternate contact with the photosensitive drum 217 so that an electrostatic image formed on the photosensitive drum is developed by means of the toners. Numeral 223 represents a transfer drum upon which paper fed from a paper cassette 224 or 225 is wound so that the image developed on the photosensitive drum 217 may be transferred to the paper.

After four colors M, C, Y and Bk have thus been transferred successively, the paper is ejected through a fixing unit 226.

The copying machine in this embodiment has a facility of not only copying a manuscript image, but also receiving color image data outputted from the computer and then outputting the image on a copy paper. In FIG. 1, numeral 232 is a computer interface (I/F) which receives color image data (expressed by RGB components) from the computer (not shown) connecting to the copying machine and inputs the data to the signal processor 211.

Numeral 231 is an operation panel for switching to the original-manuscript copy, selecting a data source, and switching a LUT in accordance with the tone of the image.

[Image scanner unit (FIG. 2)]

Figure 2:
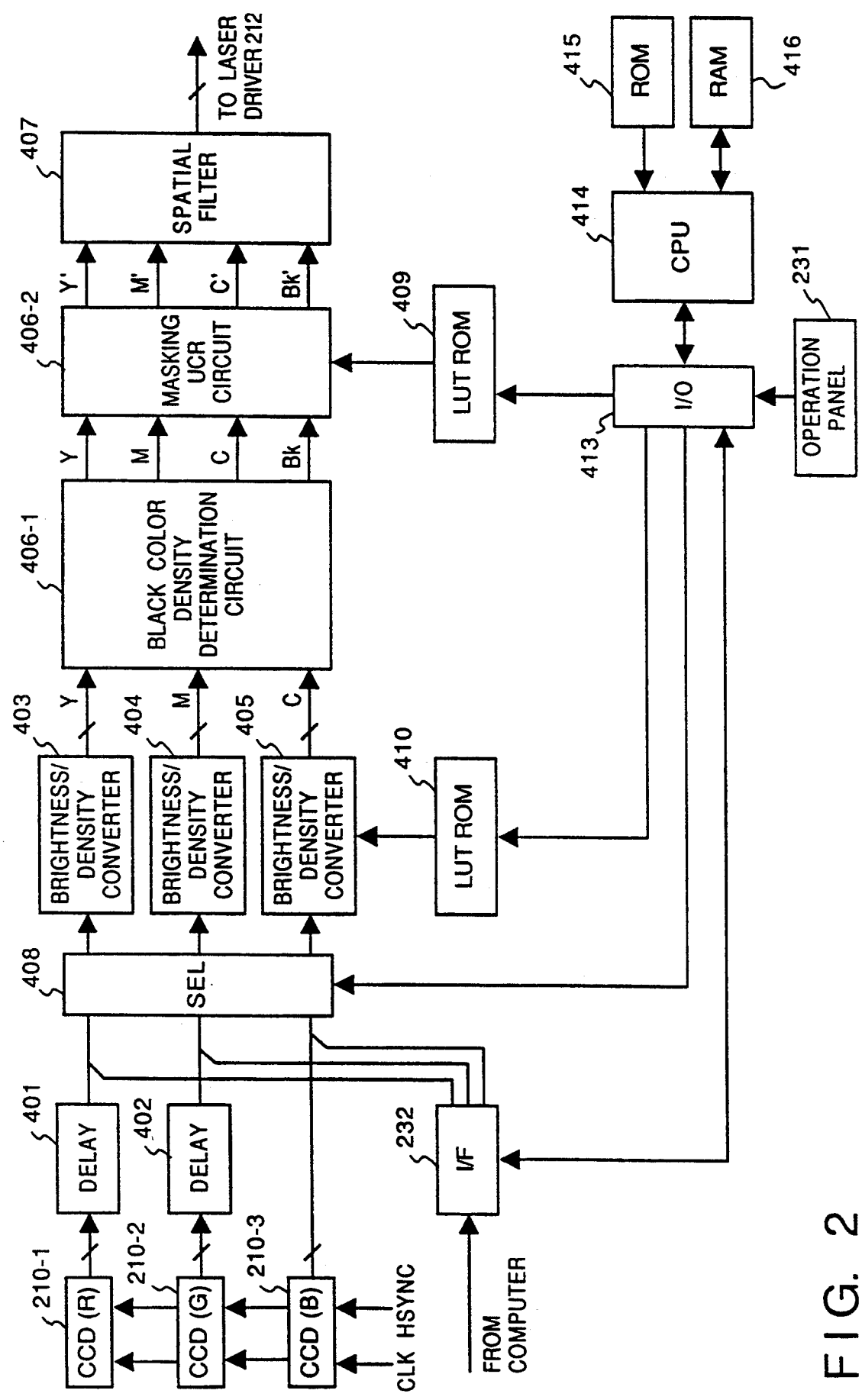
FIG. 2 is a block diagram showing the construction of an image scanner 201.

FIG. 2 is a block diagram showing the construction of the image scanning section 201. Numerals 210-1, 210-2, and 210-3 denote CCD line sensors (Charge Coupled Device) having spectroscopic sensitivity characteristics such as to be sensitive to red (R), green (G) and blue (B), respectively. After the A/D conversion, an eight-bit signal having a value of 0 to 255 is outputted.

Since the CCD line sensors 210-1, 210-2, and 210-3 used in the first embodiment are placed at regular intervals, relative spatial deviations thereof are corrected by delay elements 401 and 402.

Numeral 403, 404, and 405 denote brightness/density converters which convert an brightness signal (RGB signals) into a density signal (YMC signals). A table which represents the relationship between RGB signals and YMC signals is loaded into these converters 403, 404, and 405 from LUTROM 410 which stores the table as a look-up-table. In a case where the converters 403, 404, and 405 are integrated with a ROM respectively, the ROM may hold the look-up-table, As in/out conversion characteristics in the look-up-table which has an inverted relationship as the following:

$$Y=255-B, M=255-G, \text{ and } C=255-R.$$

Numeral 406-1 denotes a black color density determination circuit which determines a density of black (Bk) from the YMC signals. Numeral 406-2 denotes a masking UCR (under color removal) circuit which converts the inputted density signals (YMC signals) and black (Bk) signal into yellow (Y'), magenta (M'), cyan (C') and black (Bk') signals. When each of the signals Y', M', C' and Bk' is read, the signal is outputted as a signal having a predetermined bit length (8 bits in this embodiment) in a frame-sequential order. The conversion relationship between Y, M, C, Bk and Y', M', C', Bk' are as follows:

$$Bk = \min(Y, M, C)$$

$$Y' = Y - \alpha \cdot Bk + \beta \cdot 255 \cdot \left(\frac{Bk}{255}\right)^{\gamma}$$

$$M' = M - \alpha \cdot Bk + \beta \cdot 255 \cdot \left(\frac{Bk}{255}\right)^{\gamma}$$

$$C' = C - \alpha \cdot Bk + \beta \cdot 255 \cdot \left(\frac{Bk}{255}\right)^{\gamma}$$

$$Bk' = a \cdot Bk + b \cdot 255 \cdot \left(\frac{Bk}{255}\right)^{\gamma}$$

where $0 < \alpha \leq 1$ and $\alpha$ is a function of the density values of Y, M, C, $-1 \leq \beta \leq 1$, $1 \leq \gamma \leq 3$, $0 \leq a \leq 1$, $0 \leq b \leq 1$. Here, "$\gamma$" is a power exponent. The conversion relationship is stored in an LUT ROM 409 as a look-up-table (hereinafter referred to as a "LUT"). When the actual UCR processing or black color density extraction processing is performed, the YMC signals are converted into the Y'M'C'Bk' signals referring to the LUT. The LUT ROM 409 stores a plurality of LUTs (two LUTs in this embodiment) which can be switched in accordance with the tonality of the input image. The above processings can be performed in a CPU (described later). In this case, the CPU calculates the above conversion relationship, using the coefficient values, $\alpha$, $\beta$, $\gamma$, stored in a ROM (described later), and outputs the results to the masking UCR circuit 406-2.

Numeral 407 denotes a spatial filter circuit which performs edge correction and the like.

Numeral 414 denotes a microcomputer (hereinafter referred to as a "CPU") for controlling the present apparatus. Numeral 415 denotes a ROM storing a program which operates the CPU 414. Numeral 416 represents a RAM which is used as a work area for executing various programs. Numeral 413 represents an input/output port (hereinafter referred to as an "I/O port") connected to the CPU 414.

In this apparatus, a color image is formed by copying an original image manuscript 204 on platen 203 or inputting color image data (RGB signals) outputted from the computer connecting to the present apparatus, and the color image is outputted to a copy paper. The input data is switched by a selector 408. The switching is performed by instructions from the operation panel 231. Similarly, switching the LUT is performed by instructions from the CPU 414 in accordance with the instruction from the operation panel 231.

[Operation Panel (FIG. 3)]

Figure 3:
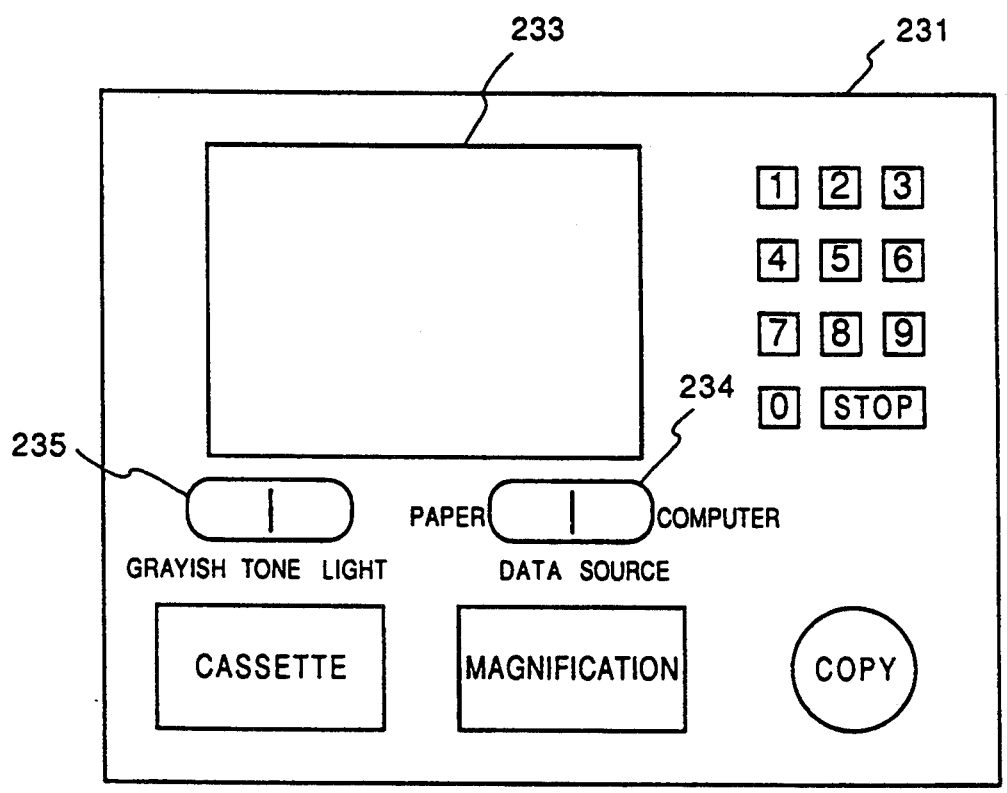
FIG. 3 is a layout of the operation panel 231 of the color copying machine.

FIG. 3 shows a layout of the operation panel 231 of the color copying machine of the present embodiment. In FIG. 3, numeral 233 is an LCD display panel for displaying various messages along with copying operation and input operation of computer output data. Numeral 234 is an input data selection switch for selecting if the input data source is an image original or computer output data. Numeral 235 is a tonality selection switch for selecting whether the tonality of the input image data is light or grayish. The LUT stored in the LUT ROM 409 is switched by instruction from the tonality selection switch 235.

[Characteristics of the LUT Conversion (FIGS. 4~5)]

Figure 4:
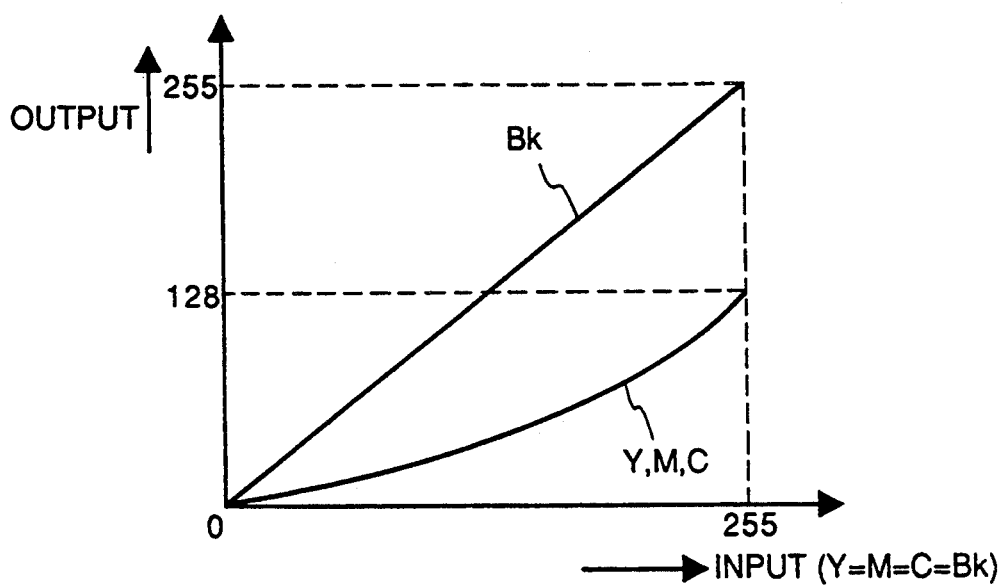
FIG. 4 is a diagram showing the characteristics of masking UCR in accordance with a first LUT (look-up-table)

FIG. 4 is a diagram showing an example of the LUT used in the present embodiment. The masking UCR circuit 406 of the present embodiment performs the UCR processing and black color density extraction processing by using the LUT stored in the LUT ROM 409 in accordance with the instruction of the tonality selection switch 235.

The UCR processing and black color density extraction processing using the LUT having the conversion characteristics, shown in FIG. 4, are first described. In FIG. 4, the horizontal axis represents density values of YMC and Bk which the masking UCR circuit 406-2 inputs. The vertical axis represents density values of Y'M'C' and Bk' which are outputted from the masking UCR circuit 406-2. It is assumed that the input image signal is a signal representing a halftone image of gray, that is, the case where Y=M=C=B is held for the density signals is considered.

Figure 7:
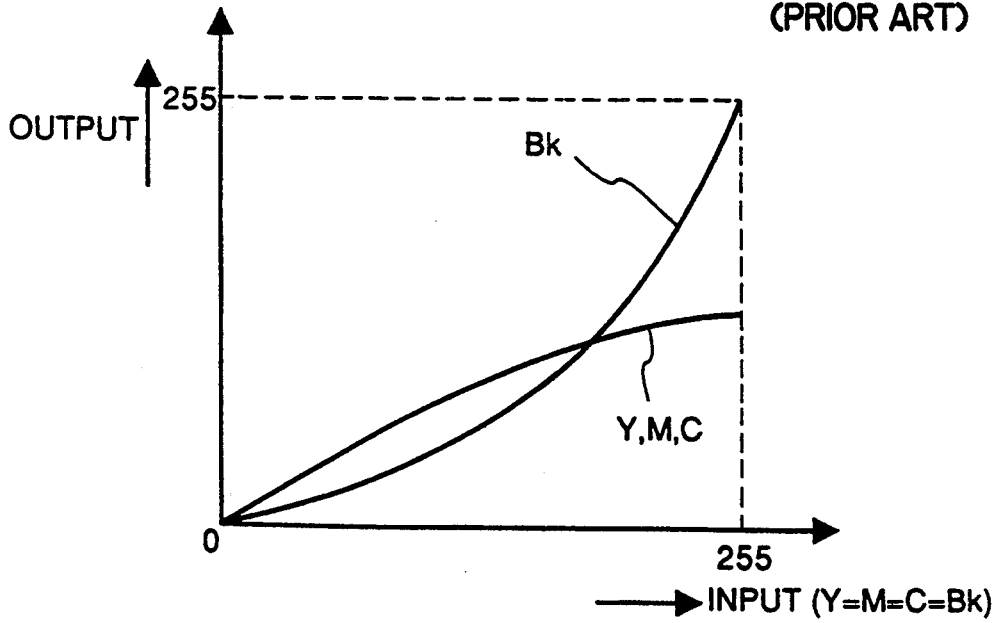
FIG. 7 is a diagram showing the characteristics of masking UCR in a prior art.

As shown in FIG. 4, when the LUT is used, an input maximum density value (255) in Bk is converted into a maximum value (255) as the prior art shown in FIG. 7. However, in the present embodiment, Bk is outputted so as to increase proportionally from the low density area to the high density area. Accordingly, the output amount of Bk is increased in the intermediate density area in comparison with the conversion characteristics of the prior art shown in FIG. 7.

On the other hand, the input maximum density value in YMC is converted into the density value which is approximately half (~128) of the maximum value of Bk. This is similar to the conversion characteristics of the prior art. The reason why Y', M', and C' take an intermediate value of the input density value and an LUT is set to maintain the density is as following. That is, because in the above equation for conversion, when $\alpha = 1$ (this is referred to as "100% UCR"), the image is expressed by the only black and the tonality of the entire image cannot be increased.

In case of the LUT shown in FIG. 4, in the low density area, the rate of increasing values (Y', M', C') is small in comparison with the rate of increasing values of Y, M, C. On the other hand, the rate of increasing values (Y', M', C') gradually becomes greater than that of increasing values (Y, M, C) as the value of the densities becomes higher. Accordingly, the output values (Y', M', C') are rather small in the low and intermediate density area in comparison with the prior art.

As a result, when the LUT of FIG. 4 is used, outputs for Y, M, C are small but output for Bk is large in a halftone portion of the low density area and intermediate density area. Accordingly, the color reproducibility of gray influenced by color blurs is improved and the homogeneity of the color of the entire output image can be easily maintained. Such LUT is effective when the overall tonality of the input image has less gray and is a bright and light image.

The LUT shown in FIG. 4 has a characteristic that an increasing rate of the output density value (Y', M', C') is small in comparison with that of the input density value (Y, M, C). The ratio gradually increases as the density increases. However, the LUT used in the present embodiment is not limited to the above example. For example, if the output of Y, M, C in the low density area where the color irregularity stands out is further reduced or the output is suspended, the color reproducibility of gray is improved and the color homogeneity of the output image can be maintained.

Figure 5:
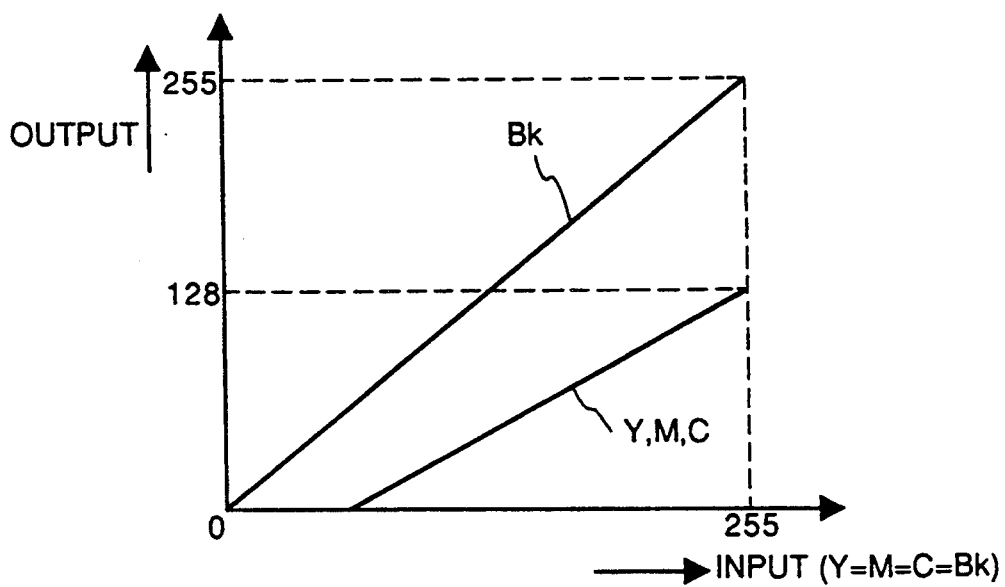
FIG. 5 is a diagram showing the characteristics of masking UCR in accordance with a second LUT.

The LUT which controls not so as to output Y, M, C in the low density area where the color irregularity stands out is described with reference to FIG. 5. In FIG. 5, the values on the horizontal axis and vertical axis are the same as those in FIG. 4. It is assumed that the input image signal is a signal expressing a halftone of gray color, that is, Y=M=C=Bk is held for the density signal.

In this case, as shown in FIG. 5, Y, M, C are not outputted in the low density area where the color irregularity stands out and Y', M', C' are outputted to the input density value from around the halftone density area. Such LUT is effective when the overall tonality of the input image has more gray and is rather a monochromatic image.

The above processing is a monochromatic processing where the low density area of the input color image data is regarded as an achromatic area.

According to the present embodiment, the UCR and black toner amount are increased in the halftone portion, while the UCR is decreased in the high density area. Accordingly, the color irregularity in the grayish halftone is suppressed and the homogeneity of color of the entire output image can be compensated.

According to the present embodiment, even if vibration at the image formation of the color copying machine or an revolutionary deviation of driving system is caused, and a gray balance (the balance of Y, M, C) of the printer becomes being out of balance, the gray color can be fully outputted as a gray.

In the present embodiment, only the two LUTs are described. However, this does not impose a limitation upon the present invention. For example, the reproducibility of gray color can be improved by suppressing the color blurs in the low density area using another LUT having various conversion characteristics. Needless to say that only a single LUT or more than two LUTs can be used in the apparatus.

Furthermore, the printing unit 202 of the present invention is assumed to be a laser beam printer. However, this does not impose a limitation upon the present invention. For example, an ink-jet printer can be adapted to the present invention.

Furthermore, it can be arranged so that either the black color density determination circuit 406-1 or the masking UCR circuit 406-2 detects whether or not the output level of Y, M, C in the achromatic area is less than a predetermined level and the monochromatic processing is performed by expressing the achromatic area with Bk. In this way, problems such as color blurs to the achromatic area can be eliminated.

Figure 6:
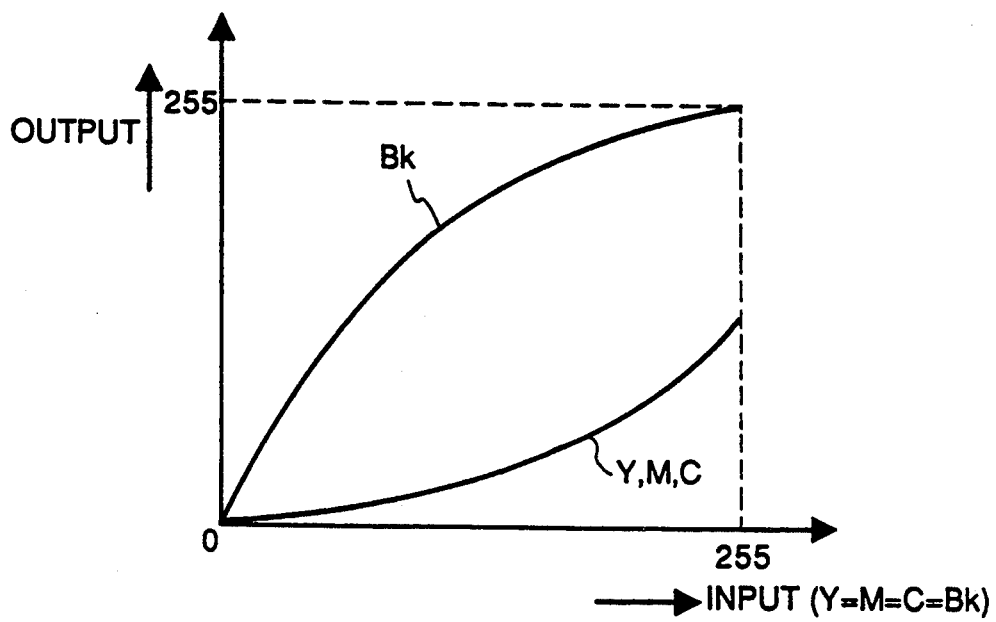
FIG. 6 is another diagram showing the characteristics of masking UCR.

Furthermore, conversion of Y, M, C, and Bk (input) into Y', M', C', and Bk' (output) can be performed in accordance with the in/out relationship shown in FIG. 6.

The conversion has a characteristics such that, when the four colors, Y, M, C, and Bk are overlaid, the density actually printed can be expressed by the sum of the gray density made by the three colors, Y, M, and C, and the gray density made by Bk, thus the gray density is printed in linear correspondence to the input.

In other words, the conversion is performed in a case where $\alpha=1$, $\beta=0.5$, $\gamma=1.7$, a=1.5, and b=−0.5 in the aforementioned formula.

The method described in this embodiment is advantageous since a color blur occurring in a color image formation apparatus is greatly extinguished by sequentially transferring M, C, Y, and Bk, for example, onto a recording medium.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A color image processing method adapted to a color processing apparatus for converting a multivalued brightness image signal into a multivalued density image signal, comprising:

a conversion step for converting a first multivalued density image signal to a second multivalued density image signal that includes a Bk (black) component and Y (yellow), M (magenta) and C (Cyan) color components so that, in a case of expressing an achromatic halftone, the Bk component instead of each of the color components Y, M and C is convexly and montonically increased with respect to an increase of a density value of the first multivalued density image signal; and an image forming step of forming an image in accordance with the second multivalued density image signal.

2. A color image processing method adapted to a color processing apparatus for converting a multivalued brightness image signal into a multivalued density image signal, comprising:

a first conversion step for converting a first multivalued density image signal to a second multivalued density image signal that includes a Bk (black) component and Y (yellow), M (magenta) and C (cyan) color that, in a case of expressing a halftone, the halftone is expressed with the Bk component instead of each of the color components Y, M and C, when the color components Y, M and C (cyan) composing the first multivalued density image signal converted, by quasi-inversion, from the multivalued brightness image signal are equal to each other and have a relatively small value; and a second conversion step for converting the first multivalued density image signal to a second multivalued density image signal so that, in a case of expressing a halftone, a rate of applying UCR (under color removal) is decreased when the color components Y, M and C composing the first multivalued density image signal are equal to each other and have a relatively large value, wherein a conversion rate for the expression with the Bk component in said first conversion step is convexly and montonically increased with respect to an increase of a density value of the first multivalued density image signal.

3. A color image processing apparatus for converting a multivalued brightness image signal into a multivalued density image signal, comprising:

input means for inputting a color image as a brightness image signal;

first conversion means for converting the brightness image signal to a first density image signal;

extraction means for extracting a black component from the first density image signal;

second conversion means for converting the first density image signal to a second density image signal by performing UCR processing based upon the black component so as to express the color image by using the black component, in an area where a signal density value of the first density image signal is in a low or intermediate density area, in a manner such that a level of the black component for expressing the color image is convexly and montonically increased with respect to an increase of the density value; and output means for outputting the color image using said second density image signal, wherein a UCR (under color removal) amount ratio in UCR processing applied to the intermediate density area is greater than that in UCR processing applied to a high density area.

4. The apparatus according to claim 3, wherein said input means inputs color images including an original image manuscript and color image data outputted from an external computer.

5. The apparatus according to claim 4, wherein said input means comprises:

reading means for reading color image data from an original image manuscript;

connecting means for connecting to the external computer;

reception means for receiving the color image data outputted from the external computer; and switching means for switching the color image data input from said reading means or color image data input from said reception means verse versa respectively.

6. The apparatus according to claim 3, wherein said second conversion means comprises:

at least one look-up-table showing the conversion relationship between said first density image signal and said second density image signal;

storage means for storing said look-up-table; and selection means for selecting the look-up-table for converting said first density image signal to said second density image signal in the case where more than one look-up-table are stored in said storage means.

7. The apparatus according to claim 6, wherein said first density image signal is composed of three color components, Y (yellow), M (magenta), C (cyan), and said second density image signal is composed of four color components, Y (yellow), M (magenta), C (cyan), Bk (black).

8. The apparatus according to claim 7, wherein said look-up-table is applied to an image signal expressing an achromatic color where each color component of Y (yellow), M (magenta), C (cyan) comprising said first density signal is equal to each other.

9. The apparatus according to claim 8, wherein said look-up-table has conversion characteristics such that, in a case where said first density image signal has a small density value, each value of color components Y (yellow), M (magenta), and C (cyan) in said second density image signal is small compared with each of those in said first density image signal, and the conversion rate using Bk (black) increases, and in a case where said first density image signal has a large density value, a rate of expression with each value of the color components Y (yellow), M (magenta), C (cyan) increases.

10. The apparatus according to claim 8, wherein said look-up-table has conversion characteristics such that, in a case where said first density image signal has a small density value, each of color components Y (yellow), M (magenta), C (cyan) is expressed with black, and in a case where said first density image signal has a large density value, the conversion rate using each value of color components Y (yellow), M (magenta), C (cyan) increases.

11. The apparatus according to claim 3, wherein said output means is a laser beam printer.

12. The apparatus according to claim 3, wherein said output means is an ink-jet printer.

13. A color image processing method comprising the steps of:

inputting a color image signal; and increasing an under color removal amount ratio when a density value indicated by the color image signal is an intermediate density so that the under color removal amount ratio in an intermediate density portion becomes greater than that in a high density portion, wherein a level of a black component obtained after UCR processing is convexly and montonically increased with respect to an increase of the density value.

14. The method according to claim 13, wherein the color image processed is outputted using a laser beam printer.

15. The method according to claim 13, a single-color black processing is performed in the case where the density indicated by the color image signal is intermediate.

* * * * *

UNITED STATES PATENT AND TRADEMARK OFFICE
CERTIFICATE OF CORRECTION

PATENT NO. : 5,386,305

DATED : January 31, 1995

INVENTOR(S) : Akihiro Usami

It is certified that error appears in the above-identified patent and that said Letters Patent is hereby corrected as shown below:

Column 4, line 57, change "an" to --a--.

Column 5, line 33, change "$-1 \leq \beta 1,$" to -- $-1 \leq \beta \leq 1,$ --.

Column 6, line 46, change "art" to --art.--; and
line 51, change "the only" to --only--.

Column 7, line 40, change "an" to --a--; and
line 42, delete "being".

Column 8, line 38, change "montonically" to --monotonically--;
line 52, change "color" to --color components so--; and
line 55, delete "(cyan)".

UNITED STATES PATENT AND TRADEMARK OFFICE
CERTIFICATE OF CORRECTION

PATENT NO. : 5,386,305
DATED : January 31, 1995
INVENTOR(S) : Akihiro Usami

It is certified that error appears in the above-identified patent and that said Letters Patent is hereby corrected as shown below:

Column 9, lines 3 and 25, change "montonically" to --monotonically--; and
line 48, change "verse versa" to --vice versa--.

Column 10, line 49, change "montonically" to --monotonically--; and
line 55, change "a" to --wherein a--.

Signed and Sealed this

Sixteenth Day of May, 1995

Attest:

BRUCE LEHMAN

Attesting Officer     Commissioner of Patents and Trademarks